Jan. 16, 1962   F. R. McFARLAND   3,017,196
SUSPENSION INTERLINKAGE
Filed May 10, 1954   3 Sheets-Sheet 2
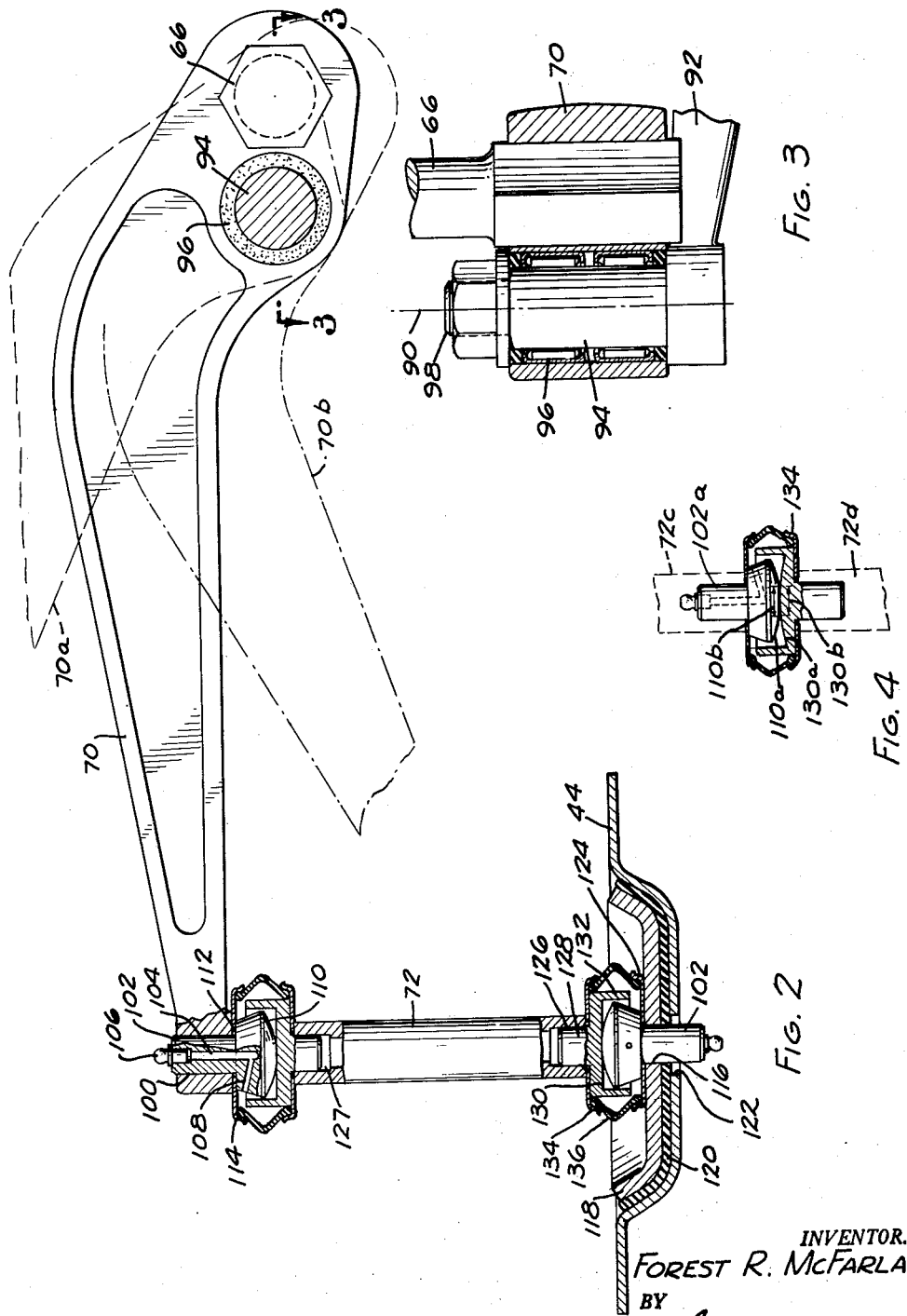
INVENTOR.
FOREST R. McFARLAND
BY
Wilson, Redrow, and Gaines
ATTORNEYS.

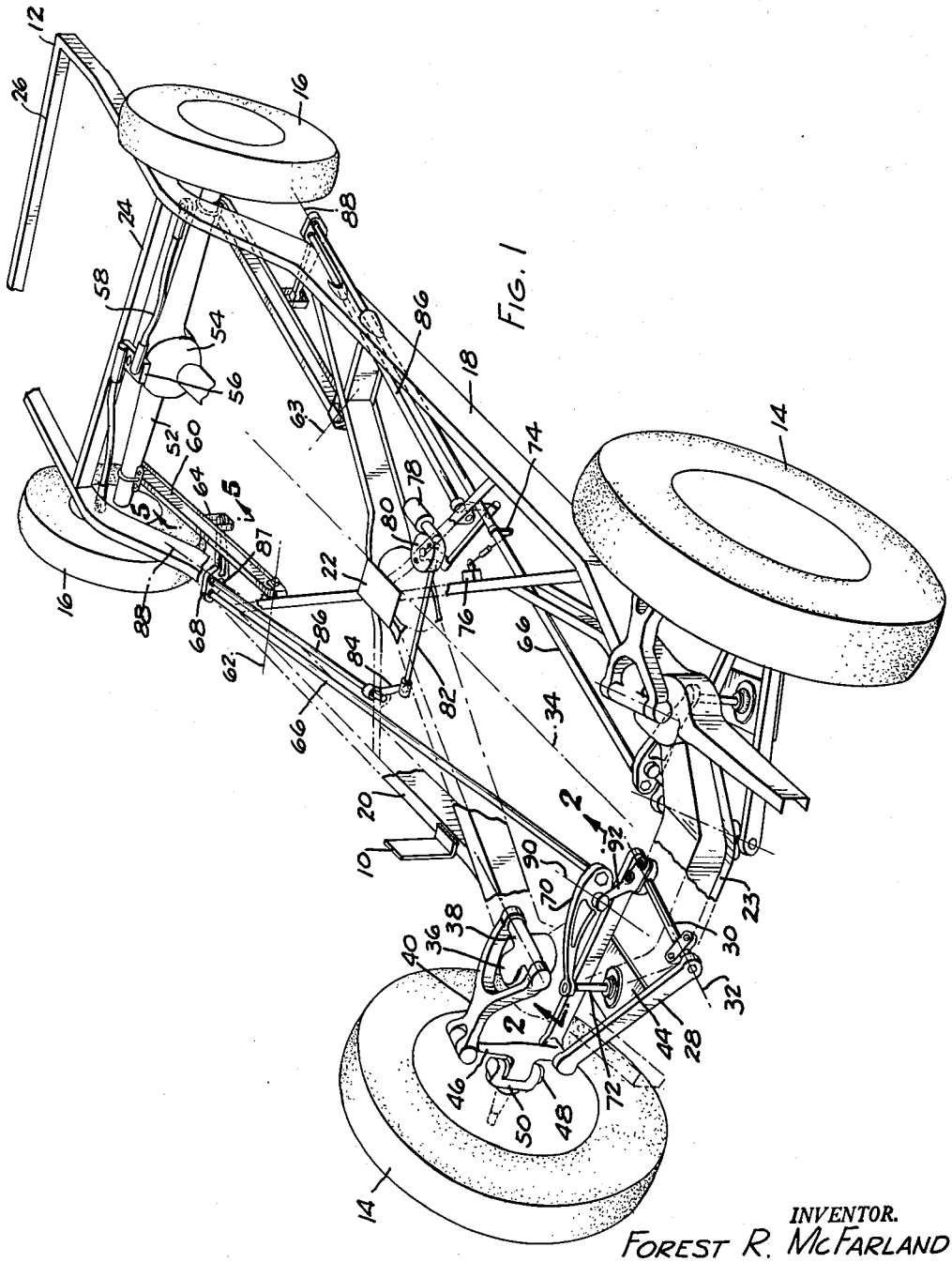

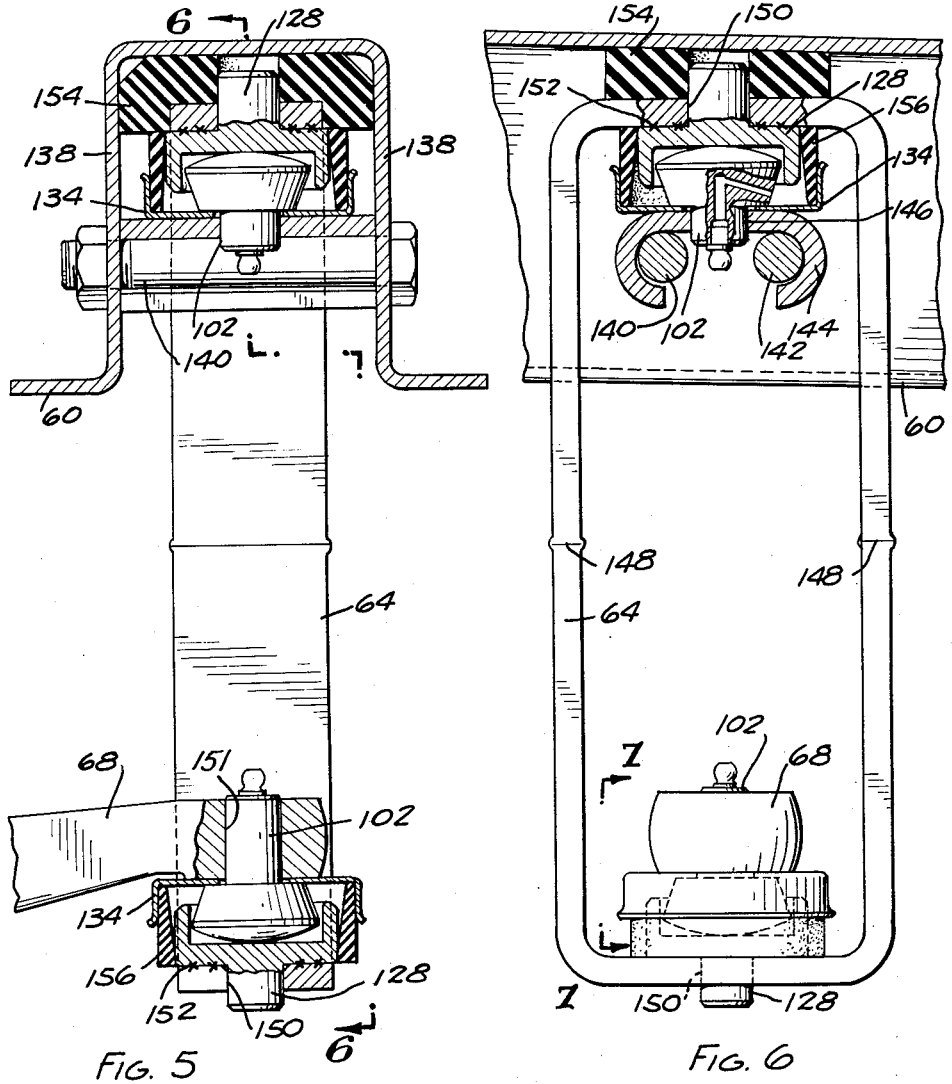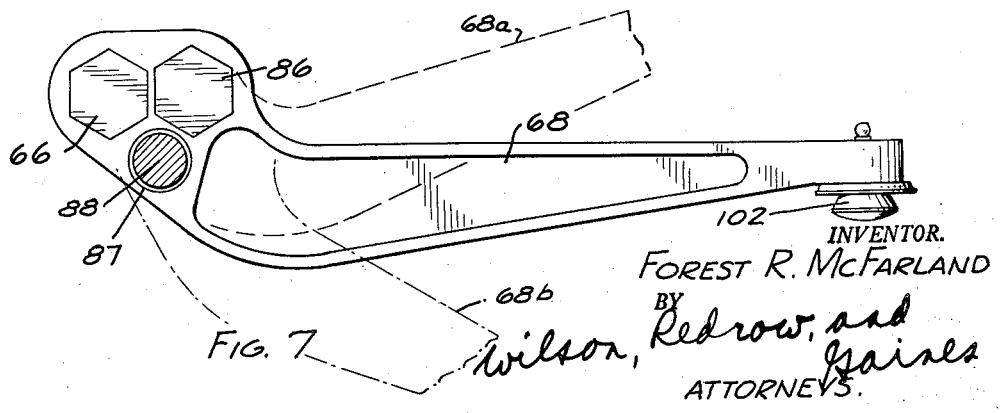

United States Patent Office 3,017,196
Patented Jan. 16, 1962

3,017,196
SUSPENSION INTERLINKAGE
Forest R. McFarland, Huntington Woods, Mich., assignor to Studebaker-Packard Corporation, a corporation of Michigan
Filed May 10, 1954, Ser. No. 428,730
21 Claims. (Cl. 280—124)

The present application relates to a suspension interlinkage for automotive vehicles, and particularly to a bind free linkage system for efficiently interconnecting the front and rear wheel suspensions of a four-wheeled vehicle for coordinated movement by pairs, for instance, coordinated movement as between the right front and right rear wheels and between the left front and left rear wheels.

One or more vehicle suspension systems hitherto known have utilized torsion bar load spring linkages for interconnecting the laterally extending front and rear wheel suspensions at each of the opposite sides of the vehicle in a manner whereby an anti-galloping motion reversal takes place tending to cause a wheel at one side to go into a position of rebound at the time at which the companion wheel on the same side is being forced by road irregularities to travel in the opposite direction, that is jounce-wise travel, and vice versa. For example, an expired U.S. Patent No. 2,099,819 discloses torsion bar load spring means at each side of the vehicle, one load spring means elastically interconnecting the movable left front and left rear wheels in a manner to provide for a gear achieved motion reversal therebetween and the other load spring means similarly interconnecting the right front and the right rear wheels. The accomplishment of this reversal of motion by the noted means of gears introduces rather excessive tooth loadings on the gears and the transference and simultaneous reversal of motion in other known fashions such as by linkages has introduced various disadvantages and complications not the least of which is binding in the joints under the shock loads experienced in the transference process.

An object of the invention herein presented is to provide a novel bind free suspension interlinkage for overcoming the foregoing disadvantages and for efficiently simultaneously transferring and reversing dynamic wheel displacing disturbances between the front and rear wheels so as to materially reduce and in fact largely eliminate any galloping or pitching action commonly observed in vehicle chassis suspensions about a centrally located transverse axis through the chassis.

Another object of the invention according to the various embodiments is the provision of a bind free linkage between a torsion bar load spring asembly and a wheel suspension assembly wherein an interconnecting link common to the two assemblies has parallel flat opposite end surfaces which when engaged in a single point contact by contacting rolling surfaces connected for movement with the respective assemblies inherently tend to maintain a constant effective or uniform length for the link despite its changes in angular position due to the motion of articulation thereof.

An additional object is the provision of a compensating interconnecting link between two swinging arms of adjacent assemblies as defined in the foregoing object wherein the two swinging arms have differing lengths and have separated horizontal swing axes and wherein the link for interconnecting the same is relatively short in comparison to the length of the arms but easily articulates friction free in two directions of freedom due to the single point rolling type contact of engagement of its ends in the above described manner.

Another object of the invention is to provide a link for forming joints at its opposite ends for interconnecting two arms as defined in the preceding object wherein a rubber bonded interconnection is provided between at least one of the end joint connections from the link and its associated assembly.

Another object of the invention is to provide in conjunction with two relatively swingable arms and an interconnecting link therebetween, a pair of joint forming studs which are self-retained in place between each one of the opposite ends of the link and the arm at that end and which form one-way compression joints having single point interfaced contact of rolling engagement; according to a feature of this invention the studs are rendered self-retainably mounted in place by being pressed with an interference fit into an undersized recess or bore formed in the respective companion swinging part to which they are mounted.

An additional object is the provision of a link to arm interconnecting joint formed by a pair of studs as defined in the preceding object wherein one stud in each pair is a ball type stud which is internally passaged for the transmission of lubricant therethrough to the joint.

Further features, objects, and advantages will either be specifically pointed out or become apparent when, for a better understanding of the invention, reference is made to the following written description taken in conjunction with the accompanying drawings in which:

FIGURE 1 is a perspective view of a vehicle chassis embodying the present anti-friction suspension linkage;

FIGURE 2 is a side face view of the suspension link of FIGURE 1 taken along the section lines 2—2 thereof;

FIGURE 3 is a sectional view of the frame attached pivot joint for the arm of FIGURE 2 taken along the sections lines 3—3 thereof;

FIGURE 4 is a fragmentary showing of a modified form of the joint for the ends of the link of FIGURE 2;

FIGURE 5 is a side sectional view taken along the lines 5—5 of FIGURE 1;

FIGURE 6 is a longitudinal sectional view taken along the lines 6—6 of FIGURE 5; and FIGURE 7 is a full face view of the lower link shown in FIGURE 5.

In FIGURES 1, 2, and 3 of the drawings a load carrying vehicle body 10 is shown supported by a chassis frame 12 adapted to be spring suspended between a pair of left and right front wheels 14 and between a pair of left and right rear wheels 16. The frame 12 includes a pair of laterally spaced apart longitudinally extending side rails 18 and 20 which are rigidly secured together in their central portions by means of an X frame structure 22. At their forward ends the frame side rails 18, 20 present bumper horns and are joined together as by a drop centered front cross member 23 and at their rear ends the frame side rails 18 and 20 are joined together by an intermediate rear cross member 24 and an extreme cross member 26. The front cross member 23 of the frame 12 is connected to each of the front wheels 14 by means of a wish bone type unsprung assembly in which conventional construction is used and of which in the interest of brevity only the right hand suspension assembly will be specifically described below.

A two link A-frame type lower control arm 28 in the right front suspension assembly is mounted for swinging movement to the front cross member 23 by means of a rigid pivot bar 30 which is stationarily bolted to the front cross member and defines a substantially longitudinally extending arm swing axis 32. The lower control arm swing axis 32 on the vehicle right side converges rearwardly with respect to the axis for the left front control arm assembly and each axis defining pivot bar is laterally offset with respect to a central longitudinal axis of the vehicle indicated at 34.

A hat shaped steel stamping 36 mounted to the upper outer end of the front cross member 23 carries a stationary pivot bar bracket 38 to which a wish bone shaped upper control arm 40 is pivoted to swing about a substantially longitudinally extending horizontal swing axis 42. The lower control arm 28 carries a pan intermediate the ends thereof having the shape of a gusset plate 44 for rigidifying the two links thereof into an integral unit. At their outer ends the respective upper and lower control arms 40, 28 are pivotally joined to a vertically extending knuckle support arm 46 which carries a kingpin 48 on which a wheel spindle and knuckle forging 50 is hingedly mounted for steering movement of the right front wheel 14. The knuckle and spindle forging 50 is received in a bearing in the hub of the front wheel 14 in orthodox fashion for journalling the same. The suspension assembly for the left front wheel 14 is similar.

The rear wheels 16 are mounted to a set of drive axles carried within a common transversely disposed axle housing 52 having an encased differential 54 approximately at the center thereof. Atop the case of the differential 54 a double ended link 56 is mounted for oscillatory movement about a vertical axis passing through the center thereof and having each of its opposite ends pivotally connected to an anti-sway stabilizer linkage comprising a pair of oppositely extending S-shaped bars 58. The lateral outer ends of the S-shaped bars 58 are connected to the frame side rails 18 and 20 in a position forward of but adjacent to the intermediate rear frame cross member 24. The anti-sway stabilizing linkage forms no part of the present invention and is shown and described in more complete detail in connection with FIGURE 5 for instance in the expired patent to Marcum No. 1,825,194. A pair of rearwardly diverging torque arms 60 is provided which as by means of a pair of shackles is secured at their rear ends to the outer ends of the axle housing 52 and at the forward end each of the torque arms 60 is pivoted to the frame X-member structure 22 so as to swing about substantially horizontal separate swing axes 62 and 63 which converge rearwardly and intersect in the vicinity of the longitudinal central axis 34 of the vehicle. At intermediate portions of their length each of the torque arms 60 carries a depending strap linkage 64. A pair of torsion bar load springs 66 disposed on opposite sides of the chassis frame 12 are mounted relative to one another so that their axes rearwardly diverge. The torsion bars 66 pass non-interferingly through appropriate openings in the cross member structure 22 and the frame side rails 18, 20 and at their rear ends the torsion bars are hexagonally formed to provide a splined connection to a laterally inwardly directed arm 68. The arm 68 is connected at its inner end to the depending loop type strap or link 64 which is supported by the adjacent torque arm 60. At its forward end each of the torsion bar load springs 66 is similarly hexagonally formed to provide a splined connection to a laterally outwardly extending swinging arm 70 which at its outer end is inter-connected by means of a thrust link 72 to the rigid pan 44 on the lower control arm 28.

The torsion bar load spring 66 on the left side of the chassis has a depending finger 74 rotatively fast thereto which controls the actuation of a time delay operating switch 76 for operating a compensating motor 78 mounted to the X structure 22. The finger 74 is located at a nodal point or neutral point of movement of the torsion bar load spring 66 such that when both wheels 14 and 16 on the left hand side move vertically in the same direction simultaneously the finger 74 remains stationary. Unequally changing loads on either the left and right front wheels or the rear wheels cause the torsion bar to make the finger 74 assume a displaced position whereby it actuates the compensating motor 78. Through a suitable gear box 80 and a pair of laterally extending links 82, 84 the compensating motor 78 drives a pair of compensating bars 86 which are splined to the inwardly extending lateral arm 68 at the rear of the vehicle in a similar manner to the main load spring bars 60. This arm 68 at the rear of the vehicle is pivotally mounted at 87 to the frame side rail 18 or 20 as appropriate to define a stationary swing axis indicated at 88. The compensating bars 86 are so arranged through the linkage 82, 84, 80 to move in opposite directions from one another when activated by the motor 78 and thereby tend to lower each rear suspension adjacent the wheels 16 or raise the same by an identical amount on opposite sides of the vehicle. The time delay mechanism in the switch 76 is such as to cause a time delay of between 6 and 8 seconds between the time at which the vehicle is first moved out of trim, for instance, due to an excessive load in the trunk and the subsequent time at which the compensator motor raises or lowers the rear end of the vehicel to bring it back into trim as appropriate.

The front laterally extending arms 70 are pivoted to swing about a substantially longitudinally extending horizontal axis 90 defined by a stationary frame connected forged bracket 92.

In particular reference to FIGURES 2 and 3 the just noted bracket 92 includes an integral journal portion 94 about which a pair of spaced apart sets of needle bearings 96 is mounted. The spring connected arm 70 is appropriately secured in place about the bearing 96 as by a nut receiving threaded end 98 formed on the stud portion 94 of the forging 92. At its lateral outermost end the spring connected arm 70 is provided with a vertically formed transverse aperture 100 for receiving the shank of a ball stud 102. The ball stud 102 has a central lubricant conducting passage 104 provided at its outer end with a threaded grease fitting 106 of the well known zerk type. The lubricant passage 104 intersects with a laterally extending branch distributing passage 108 formed in an enlarged portion of the ball stud 102 having a part spherically shaped end surface 110. The enlarged portion of the ball stud forms a shoulder 112 with the shank thereof and between the shoulder 112 and the adjacent surface of the arm 70 a boot retaining cup 114 is clamped thereby into place.

The rigid pan 44 on the lower control arm 28 is provided with a ball stud 102 which is similar to the one just noted and which is received in interference fit in an opening 116 formed in a dished plate 118 which is cradled in a body of rubber or elastomeric resin 120 and bonded thereby to a depressed surface in the pan 44. The pan 44 has an enlarged clearance opening 122 through which the zerk-fitted outer end of the associated ball stud 102 protrudes. A similar boot retaining cup 124 is clamped between the ball stud 102 mounted on the pan 44 and the shoulder between the shank and enlarged end portion of the associated ball stud 102.

The interconnecting thrust link 72 in the front suspension is of hollow construction having a pair of counter bores 126, 127 at its opposite upper and lower ends. Into each of these counter bores the shank of a cup stud 128 is pressed in interference fit and in the interests of brevity only the cup stud 128 in the lower bore 126 is hereby described in detail. The cup stud 128 has an enlarged end portion within which the spherically rounded nose 110 of the ball stud 102 is received and which provides a flat floor 130 therefor at the bottom of the cup or the recess. A cylindrical flange 132 integral with the cup stud 128 forms the sides for the cup. A boot retaining cup 134 similar to the companion boot retaining cup 124 already noted is clamped between the enlarged end portion of the cup stud 128 and the adjacent portion of the link 72 which receives the shank of the cup stud 128. The two bores 116 and 126 are substantially axially aligned in spaced apart relationship and in similar fashion the boot receiving cups 124, 134 are axially aligned in closely spaced adjacency to receive a rubber grease retaining boot 136 which has thickened end portions each seating within a cup 124 or 134 as appropriate.

The ball studs and the cup studs 102, 128 are preferably copper plated all over except for the interior surface of the cup and the spherically rounded noses of the enlarged portions of the ball studs which were carburized to a Rockwell hardness of at least Rockwell No. C–58 in one physically constructed embodiment of the invention.

The following is given as an example of the interference fits and dimensions of the ball studs and cup studs 102, 128 pressed into the apertures 100, 116 and 126, 127 respectively:

Shank of cup stud 128___ 0.439″ O.D.
Shank of ball stud 102___ 0.439″ O.D.
I.D. of shank receiving
    bore 116_____ 0.422″ (1/64″ interference fit)
I.D. of shank receiving
    bores 126, 127_____ 7/16″ (.0015″ interference fit).
I.D. of shank receiving
    bore 100_____ 7/16″ (.0015″ interference fit).

The following is given as an example of the relative dimensions of the enlarged ends of the ball stud and cup stud 102, 128.

Generated radius of spherical curvature of
    ball stud_____ 1⅛″.
O.D. of ball stud_____ 1″.
I.D. within cup of stud 128_____ 1 1/16″.
Lateral clearance between enlarged ends__ 1 1/16″ total.

By inspection it will be seen that the laterally extending spring connected arm 70 in each of the right and left front suspensions is considerably physically longer than the associated interconnecting link 72. The following is given as an example of the relative proportions of the arm link 70, the lower control arm, and the interconnecting link 72 on the basis of the link 72 being considered as unity measured between the flat opposite floors of the bottoms of the cups carried thereby:

Length of link 72_____ 1
Length of arm 70_____ 3
Length of arm 44_____ 5

In one physically constructed embodiment of the invention, the effective length of the interconnecting link 72 between the floors of its flat bottomed ball cups was 4″ whereas the angular travel of the arm 70 between its solid line position of neutrality as shown by solid lines in FIGURE 2 and its upper and lower dotted line positions of extreme travel shown respectively at 70a and 70b was 22° in its upward direction from neutral and was 20° in its lower direction of movement from neutral making a total angular travel for the arm 70 of 42°. It will thus become readily apparent in view of the fact of the shortness of the effective length of the link 72 and in view of the magnitude of travel of 42° between extreme positions of the arm 70, that the link 72 must have complete freedom to tilt in two separate directions between its extremities of engagement with the one arm 70 which swings about one horizontal axis and with the other lower arm 44 which swings about a separate horizontal axis. To this end the boot covered joints are packed with solid lubricant which is self retained by the rubber boots 136 therewithin at all times. In the extreme positions of travel the clearance between the ball stud 102 on the arm 70 and its companion stud 128 is arranged so that the lateral sides of the ball engage the inner walls of the flanges 132 of the cup stud 128 and thereafter effectuate a sliding movement of contact rather than a pure rolling movement of contact which occurs in the range of travel in their neutral or central positions. During such engagement the 1/16″ clearance previously noted is taken up and the pure rolling contact of engagement ceases.

In FIGURE 4 a composite modification of the invention is shown where an example of an appropriate reversal of parts in the joints is made in comparison to the specific parts arrangement according to the principal embodiment of FIGURE 2; that is to say in the lower joint a modified ball stud 102a having a spherically formed surface 110a of 2⅛″ generated radius is inserted in a bottom end 72c of the interconnecting link 72 similar to the link 72 previously described. However, the bottom end of the surface 110a has a centrally located flat of the circular diameter at 110b of ⅜″ in one physically constructed embodiment and engaging the companion floor surface 130b in a cup stud 128 which is mounted to a lower control arm in the previously discussed manner and which is formed with a spherical radius of generation of 2⅛″ to yield a spherical floor portion 130a. On the other hand, the ball stud 102a in the upper joint may be identical to the stud 102 of the embodiment of FIGURE 2 and similarly adapted to be mounted to the upper swinging arm 70 but engages the floor of a cup stud carried by an upper end 72d of the link 72. In this modification, the cup stud is formed with a part spherical surface 130a having a central flat of the circular diameter as indicated at 130b of FIG. 4 of ⅜″ so as to produce a flat surface engaging the spherical surface of the stud 102a in rolling contact of engagement the same as previously noted. Thus the lowermost stud in the composite embodiment according to FIGURE 4 for both the upper and lower joints is a cup stud 128 and the only flat in each joint is formed on the stud carried by the upper end 72d and the lower end 72c of the link 72. The selection of a cup stud construction for the lowermost stud used in each joint is for grease retention purposes and the selection of the link carried studs as being the ones formed with central flats is for the purpose of maintaining a good self-centering action and uniformity in length of the link 72. The spherically curved margins of the latter are intended to relieve any clicking tendency in the joint due to eccentric loadings occasioned in extreme positions of travel.

The link 72 of the embodiments of FIGURES 2 and 4 is a thrust link which is thrust tensioned or in other words, compressively stressed between its ends and the parallel flat bottomed portions of the studs therein provide continually flush end surfaces to which the compressive forces may be inherently normal and by reason of which the effective length of the link 72 during articulation remains substantially constant.

The traction link 64 best seen according to FIGURES 5, 6 and 7 in each of the rear suspensions is tensioned or stressed under axially separative forces in the loop between its ends due to its particular manner of association with the longitudinal torque arm 60 and the laterally extending spring connected arm 68. The torque arm 60 has a generally U-shaped cross section provided by a pair of spaced apart parallel legs 138 joined integrally to a common base at one end and having their opposite ends adjacent the open side of the U-section and formed to terminate in oppositely outwardly directed transverse flanges. The legs 138 are provided with two sets of opposed registering apertures within which there are received a set of two threaded bolts 140, 142. A C-shaped stamped metal sleeve 144 internally receives and seats upon bolts 140, 142 in a manner whereby the open side of the sleeve faces downwardly. Opposite its open side and in the geometrical central portion thereof, the sleeve 144 has an aperture or bore 146 which receives the shank of a ball stud 102 similar to the ball stud 102 of the preceding embodiment of FIGURE 2. The traction link 64 is of a loop-shaped two-piece construction formed of identical halves consisting of U-shaped straps which at their common adjacent ends are butt-welded together as at 148 to provide a unitary construction and which also present opposed bases at the upper and lower extremities of the loop. Each of the opposed bases is formed with an aperture 150 for interference fitting with a cup stud 128 similar to the cup stud 128 of the preceding embodiment of FIGURE 2. In the lower joint the loop carried cup stud 128 engages a ball stud 102 having a shank press fitted into a bore 151 formed in the spring connected arm 68. As an added precaution for insuring solidarity the cup stud 128 may be welded at 152 to each of the opposite bases of the traction link 64 and in addition thereto at the upper end of the traction link 64 a body of rubber or rubber like elastic plastic 154 may be inserted between the base of the loop 64 and the base of the associated torque arm 60. A boot receiving cup 134 may be clampingly held between the enlarged portion of the ball stud 102 and the bolt receiving sleeve 144 of C-shaped section. Into the boot receiving cup 134 a lubricant confining sleeve 156 of rubber or elastic plastic is received and rests at its opposite end on the base of the adjacent loop shaped link 64.

The following is given as an example of the interference fits and dimensions of the ball studs and cup studs of FIGURES 5 and 6:

| | |
|---|---|
| Shank of cup stud 128 | 0.439″ O.D. |
| Shank of ball stud 102 | 0.439″ O.D. |
| I.D. of shank receiving bore 150 (1/64″ interference fit) | 0.422″ |
| I.D. of shank receiving bore 146 (1/64″ interference fit) | 0.422″ |
| I.D. of shank receiving bore 151 (.0015″ interference fit) | 7/16″ |

By inspection it will be seen that the laterally extending spring connected arm 68 for each of the right rear and left rear suspensions is considerably physically longer than the loop type traction link 64 measured in terms of its effective length from the cup stud junctures at either end of the latter. The following is given as an example of the relative proportions of the lengths of the traction link 64 and its associated arms 68 and 60, the effective length of the traction link 64 measured between its flat bottomed cup shaped surfaces being considered as unity.

| | |
|---|---|
| Effective length of traction link 64 | 1 |
| Effective length of spring connected arm 68 | 3 |
| Length of torque arm 60 | 9 |

In one physically constructed embodiment of the invention the inside vertical dimension measured between the opposite ends of the bases of the loop 64 was 6.406″.

In operation the spring connected arm 68 has a neutral solid line position shown by solid lines in FIGURE 7 and moves vertically upwardly therefrom into a dotted line upper position shown by the dotted lines 68a through an arc of travel of 16° in FIGURE 7 and also moves vertically downwardly from the solid line neutral position into a dotted line downward position shown by the dotted lines 68b through an arc of travel of approximately 16° to effect a complete angular travel between extreme positions amounting approximately to 32°. It will become apparent in the instance of the traction link 64, similarly to the thrust link 72 previously described, that the traction link 64 must accommodate a tilting movement of freedom at both ends in two directions in order to coordinate movement as between each of the rearwardly diverging torque arms 60 which swing about one set of horizontal axes and the associated spring connected arm 68 which moves about a separate horizontal pivotal axis; the axes of the two arms 68 and 60 being approximately at right angles to one another.

As herein disclosed the present linkage invention is shown in the environment of the passenger vehicle suspension of the automotive type. It is evident that the present linkage may also be employed to interconnect spring and suspension connected arms oscillatable in intersecting vertical planes in other analogous vehicles like trucks, buses, and trailers and in its broader aspects it may be employed to interconnect two relatively swingable arms which oscillate in intersecting planes of horizontal or other disposition dependent on the particular installation. So also the drawing shows a construction for a spring-connected swinging arm which employs a separate frame-supported pivot point adjacent to and spaced from the attached torsion bar load spring but self-evidently the torsion bar may be appropriately journalled at its ends to the frame and serve the dual function of load spring and also of pivot bar defining the axis about which the arm is pivoted to swing. The inside diameter of the cup stud and the outside diameter of the companion ball stud differ by about 1/16″ in magnitude to afford the necessary clearance for the limits of angularity anticipated for the travel here shown but indeed it is not essential that the angularity of articulation be so limited and a slightly larger diametrically proportioned clearance will be equally advantageous for larger angles of articulation.

Variations within the spirit and scope of the invention described are equally comprehended by the foregoing description.

What is claimed is:

1. In a vehicle having a sprung assembly for supporting a load, the combination of a spring connected arm having means for attaching the same to the sprung assembly for oscillatable swinging movement relative thereto, a wheel-connected-suspension-assembly arm having means for attaching the same to the sprung assembly for oscillatable swinging movement relative thereto in the vicinity of the spring connected arm but about a separate swing axis, said arms each providing recess forming means and together having a common interconnecting link presenting a recess paired with each of the arm recesses with the recesses of each pair being opposed to one another in a registering relationship of closely spaced adjacency, and a compression bearing joint including a pair of studs connected with each pair of recesses, respectively; one stud of each pair having a rounded end portion engaging a bearing surface formed near the end of the other stud of each pair at a single point of rolling contact.

2. In a vehicle having a sprung assembly for supporting a load, the combination of two spaced arms and a torsion bar splinedly connected at its opposite ends to the different arms, said spring connected arms having means for attaching the same to the sprung assembly for independent oscillatable swinging movement relative thereto, a wheel-connected-suspension-assembly member adjacent each arm having means for attaching the same to the sprung assembly for oscillatable swinging movement relative thereto in the vicinity of the adjacent spring connected arm, each arm and its adjacent suspension assembly member providing recess forming means and together having a common interconnecting link presenting a companion recess paired with each of the recesses aforesaid with the recesses of each pair being opposed to one another in a registering relationship of closely spaced adjacency, and a compression bearing joint including a pair of studs connected with each pair of recesses, respectively; one stud of each pair having a generally spherically shaped end portion and the other stud of each pair having a cup shaped end portion with a flat bottom bearing surface which is adapted to receive and engage the cylindrical end portion of said one stud at a single point of rolling contact.

3. In a vehicle having a sprung assembly for supporting a load, the combination of a spring connected arm having means for attaching the same to the sprung assembly for oscillatable swinging movement relative thereto, a wheel-connected-suspension-assembly arm having means for attaching the same to the sprung assembly for oscillatable swinging movement relative thereto in the vicinity of the spring connected arm, said arms each providing recess forming means and together having a common interconnecting link presenting a recess paired with each of the arm recesses with the recesses of each pair being opposed to one another in a registering relationship of closely spaced adjacency, and a compression bearing joint including a pair of studs pressed into each pair of recesses, respectively; one stud of each pair having a spherically shaped nose portion and the other stud of each pair having a cup shaped end portion with a flat bottom bearing surface which is adapted to receive and engage the spherical nose portion of said one stud at a single point of rolling contact.

4. In a vehicle having a sprung assembly for supporting a load, the combination of a spring connected arm having means for attaching the same to the sprung assembly for oscillatable swinging movement relative thereto, a wheel-connected-suspension-assembly arm having means for attaching the same to the sprung assembly for oscillatable swinging movement relative thereto in the vicinity of the spring connected arm, said arms each providing recess forming means and together having a common interconnecting link presenting a recess paired with each of the arm recesses with the recesses of each pair being opposed to one another in a registering relationship of closely spaced adjacency, and a compression bearing joint including studs pressed into each pair of recesses and having companion enlarged end portions; one stud in each joint having a relatively small circular flat end with a generally rounded nose portion tangentially disposed in respect thereto, and the companion stud having a cup shaped end portion with a concave shaped bottom bearing surface which is adapted to receive and engage the flat end and rounded nose portion of said one stud at a single point of rolling contact.

5. In a vehicle having a sprung assembly for supporting a load, the combination of a spring connected arm having means for attaching the same to the sprung assembly for oscillatable swinging movement relative thereto, a wheel-connected-suspension-assembly arm having means for attaching the same to the sprung assembly for oscillatable swinging movement relative thereto in the vicinity of the spring connected arm, said arms each providing recess forming means and together having a common interconnecting link presenting a recess paired with each of the arm recesses with the recesses of each pair being opposed to one another in a registering relationship of closely spaced adjacency, and a compression supporting joint including studs pressed into each pair of recesses and having companion enlarged end portions cooperatively engaging one another in single point contact of rolling engagement, the stud mounted to the adjacent arm of each joint having the enlarged end thereof of frusto spherical curvature and the companion stud being of cup shape at its enlarged end and receiving the frusto spherically curved surface of the other stud in single point engagement with the floor of the cup.

6. In a vehicle having a sprung assembly for supporting a load, the combination of a spring connected arm having means for attaching the same to the sprung assembly for oscillatable swinging movement relative thereto, a wheel-connected-suspension-assembly arm having means for attaching the same to the sprung assembly for oscillatable swinging movement relative thereto in the vicinity of the spring connected arm, said arms each providing recess forming means and together having a common interconnecting link presenting a recess paired with each of the arm recesses with the recesses of each pair being opposed to one another in a registering relationship of closely spaced adjacency, a compression bearing joint including a pair of studs connected with each pair of recesses, respectively; one stud of each pair having a rounded end portion engaging a bearing surface formed near the end of the other stud of each pair at a single point of rolling contact, at least one stud in each joint having a passageway extending therethrough for supplying lubricant to the joint.

7. In a vehicle having a sprung assembly for supporting a load, the combination of a spring connected arm having means for attaching the same to the sprung assembly for oscillatable swinging movement relative thereto, a wheel-connected-suspension-assembly arm having means for attaching the same to the sprung assembly for oscillatable swinging movement relative thereto in the vicinity of the spring connected arm but about a separate swing axis, said arms each providing recess forming means and together having a common interconnecting link presenting a recess paired with each of the arm recesses with the recesses of each pair being opposed to one another in a registering relationship of closely spaced adjacency, and a compression bearing joint including studs pressed into each pair of recesses and having companion enlarged end portions cooperatively engaging one another in single point contact of rolling engagement, one stud in each joint having its enlarged end of generally spherical form and the companion stud being of cup shape at its enlarged end and receiving the spherical form of the other stud so as to engage the floor of the cup, the spherically formed stud having lubricant conducting passageway therein for introducing lubricant therethrough into the joint.

8. In a vehicle having a sprung assembly for supporting a load, a spring connected arm having means for attaching the same to the sprung assembly for oscillatable swinging movement relative thereto, a wheel-connected-suspension-assembly arm having means for attaching the same to the sprung assembly for oscillatable swinging movement in the vicinity of the spring connected arm, said arms presenting vertically spaced bore forming means substantially axially aligned with one another, articulated link means common to the arms for interconnecting the same including a member presenting a bore at each end thereof paired with the corresponding one of the vertically spaced bores at that end with the bores of each pair being opposed to one another in a registering relationship of closely spaced adjacency, bearing means fixedly mounted at one end in the bores of each of the arms, and studs pressed into the bores at opposite ends of the member having enlarged cup shaped end portions each of which receive and are in continuous surface engagement with an adjacent bearing means, said opposite cup shaped end portions having flat bottom floors therein each forming one side of the interfaces of continuous surface engagement aforesaid and being accurately parallel to one another to insure substantially uniform effective length of the member during articulated relative movement between the interconnecting link means and each of the arms.

9. In a vehicle having a sprung assembly for supporting a load, the combination of a spring connected arm having means for attaching the same to the sprung assembly for oscillatable swinging movement relative thereto, a wheel-connected-suspension-assembly arm having means for attaching the same to the sprung assembly for oscillatable swinging movement relative thereto in the vicinity of the spring connected arm, said arms each having recess forming means and together having a common interconnecting link presenting a recess paired with each of the arm recesses with the recesses of each pair being opposed to one another in a registering relationship of closely spaced adjacency, a compression bearing joint including studs pressed into each pair of recesses having enlarged end portions at least one being of generally rounded shape cooperatively engaging one another in single point contact of rolling engagement, and boot retaining flanged members clamped under the enlarged end portion of each stud and arranged to define the opposite ends of a space for a boot confined body of lubricant enclosing each cooperating pair of studs.

10. In a vehicle having a sprung assembly for supporting a load, the combination of a spring preloaded arm having means for attaching the same to the sprung assembly for oscillatable swinging movement relative thereto, a wheel-connected-suspension-assembly arm having means for attaching the same to the sprung assembly for oscillatable swinging movement in the vicinity of the spring preloaded arm, said arms each incorporating recess forming means and together having a common thrust link for interconnecting the same and presenting a recess paired with each of the arm recesses with the recesses of each pair being opposed to one another in registering relationship of closely spaced adjacency, and a compression bearing joint including studs pressed into each pair of recesses and having companion enlarged end portions; the enlarged end of one stud of each pair having a small circular flat portion with a generally rounded nose portion tangentially disposed in respect thereto, and the enlarged end of the other stud being cup shaped with a concave bottom bearing surface which is adapted to receive and engage the flat end and rounded nose portion of said one stud at a single point of rolling contact.

11. In a vehicle having a sprung assembly for supporting a load, the combination of a spring preloaded arm having means for attaching the same to the sprung assembly for oscillatable swinging movement relative thereto, a wheel-connected-suspension-assembly arm having means for attaching the same to the sprung assembly for oscillatable swinging movement in the vicinity of the spring preloaded arm, said arms each having recess forming means affixed thereto and together having a common tensioned link for interconnecting the same and presenting a recess paired with each of the arm recesses with the recesses of each pair being opposed to one another in a registering relationship of closely spaced adjacency, and a compression bearing joint including a pair of studs pressed into each pair of recesses respectively; one stud of each pair having a rounded end portion and the other having a cup shaped end portion with a flat bottom bearing surface, the latter being adapted to receive and engage the rounded end portion of said one stud at a single point of rolling contact.

12. In a vehicle having a sprung assembly for supporting a load, the combination of a spring preloaded arm having means for attaching the same to the sprung assembly for oscillatable swinging movement relative thereto a wheel-connected suspension-assembly arm having means for attaching the same to the sprung assembly for oscillatable swinging movement in the vicinity of the spring preloaded arm, said arms each providing recess forming means movable therewith and together having a common loop-shaped traction links for interconnecting the same and presenting a recess paired with each of the arm recesses with the recess of each pair being opposed to one another in a registering relationship of closely spaced adjacency, and a compression bearing joint including a pair of studs pressed into each pair of recesses respectively; one stud having a relatively small circular flat end with a rounded nose portion tangentially disposed in respect thereto, and the other stud having a cup shaped end portion with a concave bottom bearing surface which is adapted to receive and engage the flat end and rounded nose portion of said one stud at a single point of rolling contact.

13. In a vehicle having a torsionally sprung assembly for supporting a load, the combination of a spring connected swinging arm and a wheel-connected-suspension-assembly arm, means mounted to a portion of each of the just named two arms for attachment to the sprung assembly and defining separate horizontal swing axes about which the arms oscillate in intersecting vertical planes, said arms presenting axially spaced apart bores formed in structural portions of the arms at locations spaced from their horizontal swing axes, articulate link means common to the arms for interconnecting the same for coordinated vertical movement including a member provided with flanged boot retaining end cups, a ball stud received in each bore on the two arms, and flat bottomed means engaging the ball studs and clamping the flanged end cups to the opposite ends of the member in opposed relationship to the adjacent bored structural portions of the arms.

14. In a vehicle having a torsionally sprung assembly for supporting a load, the combination of a spring connected swinging arm and a wheel-connected-suspension-assembly arm, means mounted to a portion of each of the just named two arms for attachment to the sprung assembly and defining separate horizontal swing axes about which the arms oscillate in intersecting vertical planes, said arms presenting axially spaced apart bores formed in portions thereof at locations spaced from the horizontal swing axes, articulate link means common to the arms for interconnecting the same for coordinated vertical movement including a member provided with flanged boot retaining end cups, a ball stud received in each bore on the two arms, flat bottomed means engaging the ball studs and fixedly clamping the flanged end cups to the opposite ends of the member in opposed relationship to the adjacent bored portions of the arms, and complementary boot retaining cups clamped between each arm and its associated ball stud.

15. In a vehicle having a torsionally sprung assembly for supporting a load, the combination of a spring connected swinging arm and a wheel-connected-suspension-assembly arm, means mounted to a portion of each of the two named arms for attachment to the sprung assembly and defining separate horizontal swing axes about which the arms oscillate, said arms being formed with substantially vertically spaced apart stud receiving structures at locations spaced from their swing axes, articulated link means common to the arms for interconnecting the same for coordinated movement including a member provided with flanged boot retaining end cups, a ball stud mounted to each stud receiving portion on the arms, and flat bottomed means engaging the ball studs and having a portion fixedly clamping the flanged end cups to the opposite ends of the member in opposed relationship to the adjacent stud receiving structures of the arms.

16. In a vehicle having a torsionally sprung assembly for supporting a load, the combination of a spring connected swinging arm and a wheel-connected-suspension-assembly arm, means mounted to a portion of each of the two named arms for attachment to the sprung assembly and defining separate horizontal swing axes about which the arms oscillate, said arms being formed with axially spaced apart stud receiving portions at locations spaced from their swing axes, at least one of said stud receiving portions being cradled by means of a rubber band to its associated arm, articulated link means common to the arms for interconnecting the same for coordinated movement including a member provided with flanged boot retaining end cups, a ball stud mounted to each stud receiving portion on the arms, flat bottomed means operatively engaging the ball studs and having a portion clamping the flanged end cups to the opposite ends of the member in opposed relationship to the adjacent stud receiving portions of the arms, and complementary boot retaining cups clamped between the arms and their respective ball studs.

17. In a vehicle having a torsionally sprung assembly for supporting a load, the combination of a spring connected swinging arm and a wheel-connected-suspension-assembly arm, means mounted to a portion of each of the two named arms for attachment to the sprung assembly and defining separate horizontal swing axes about which the arms oscillate, said arms being formed with vertically spaced apart stud receiving structures at locations spaced from their swing axes, articulated link means common to the arms for interconnecting the same for coordinated movement comprising a member provided with a metallic stud mounted to each end thereof, a metallic stud mounted to each stud receiving portion on the arms and engaging the metallic stud on the adjacent end of said member in joint-forming single point contact of rolling engagement, the member-mounted-studs being of generally spherical curvature and at least one of said last mentioned joint forming studs having a centrally disposed flat metallic outwardly facing relatively small flat surface for engaging the uniformly spherical arm-mounted-studs and arranged whereby the lowermost stud of each joint is constituted by a cup stud for receiving an uppermost ball stud therewithin.

18. Compression bearing joint for supporting the free ends of two pivotally mounted vehicle suspension members comprising a pair of studs connected respectively to the free ends of said pivotal members in substantially aligned relation, one stud of each pair having a rounded end and the other stud having a cup shaped end portion with a flat bottom bearing surface which is adapted to receive and engage the rounded portion of said one stud at a single point of rolling contact, said one stud having a relatively small circular flat end with a rounded nose portion tangentially disposed with respect thereto, and said other stud of each pair having a cup shaped end portion with a concave bottom bearing surface.

19. Compression bearing joint for supporting the free ends of two pivotally mounted vehicle suspension members comprising a pair of studs connected respectively to the free ends of said pivotal members in substantially aligned relation, one stud of each pair having a rounded end and the other stud having a cup shaped end portion with a flat bottom bearing surface which is adapted to receive and engage the rounded portion of said one stud at a single point of rolling contact, and spring means connected to at least one of said pivotally mounted members for maintaining said pair of studs in close engagement.

20. A compression bearing joint for supporting the free ends of two pivotally mounted vehicle suspension members with means to move the free ends of said members towards each other, comprising a stud connected near the free end of each pivotal member, a supporting member disposed between said studs, studs mounted at opposite ends of said supporting member adjacent to the studs on each pivotally mounted member, each adjacent pair of studs being disposed in an aligned relation, one stud of each adjacent pair having a rounded end portion and the other stud of each pair having a cup shaped end portion with a flat bottom bearing surface; the latter being adapted to receive and engage the rounded end portion of one said stud at a single point of rolling contact, said one stud of each adjacent pair of studs having a relatively small circular flat end with a rounded nose portion tangentially disposed in respect thereto, and said other stud of each pair of studs having a cup shaped end portion with a concave bottom bearing surface.

21. A compression bearing joint device for supporting the free ends of two pivotally mounted vehicle suspension members with pre-loaded spring means to move the free ends of at least one of said members away from each other, comprising a stud connected to the free end of each pivotal member, an articulated link means for interconnecting said members for coordinated movement, a stud mounted at each end of the link means, each of the last mentioned studs being in aligned relation with an adjacent stud on said pivotal members, one stud of each pair of adjacent studs having a rounded end and the other stud of said pair of adjacent studs having a nose shaped end portion with a flat bottom bearing surface which is adapted to receive and engage the rounded portion of said one stud at a single point of rolling contact said one stud of each adjacent pair of studs having a relatively small circular flat end with a rounded nose portion tangentially disposed in respect thereto, and said other stud of each adjacent pair having a cup shaped end portion with a concave bottom bearing surface, the latter being adapted to receive and engage the former at a single point of rolling contact.

References Cited in the file of this patent

UNITED STATES PATENTS

| | | |
|---|---|---|
| 1,851,670 | Hait | Mar. 29, 1932 |
| 2,094,824 | Sanford | Oct. 5, 1937 |
| 2,607,611 | Allison | Aug. 19, 1952 |
| 2,621,057 | Oster | Dec. 9, 1952 |